United States Patent [19]
Otaki

[11] Patent Number: 5,808,790
[45] Date of Patent: Sep. 15, 1998

[54] INTEGRATED MICROSCOPE PROVIDING NEAR-FIELD AND LIGHT MICROSCOPY

[75] Inventor: Tatsuro Otaki, Tokyo, Japan

[73] Assignee: Nikon Corporation, Tokyo, Japan

[21] Appl. No.: 781,659

[22] Filed: Jan. 10, 1997

[30] Foreign Application Priority Data

Jan. 25, 1996 [JP] Japan .................................. 8-031430

[51] Int. Cl.[6] .......................... G02B 21/10; G02B 21/18; G02B 27/56; H01J 3/14
[52] U.S. Cl. .......................... 359/387; 359/372; 250/234
[58] Field of Search .................. 359/387, 368, 359/372; 250/234

[56] References Cited

U.S. PATENT DOCUMENTS

| | | | |
|---|---|---|---|
| 4,917,462 | 4/1990 | Lewis et al. | 359/368 |
| 5,105,305 | 4/1992 | Betzig et al. | 359/368 |
| 5,508,517 | 4/1996 | Onuki et al. | 250/306 |
| 5,548,113 | 8/1996 | Goldberg et al. | 359/368 |
| 5,675,145 | 10/1997 | Toda et al. | 250/306 |

*Primary Examiner*—Jon W. Henry
*Attorney, Agent, or Firm*—Klarquist Sparkman Campbell Leigh & Whinston, LLP

[57] ABSTRACT

Apparatus are disclosed that perform, on demand, both near-field microscopy (NFM) and light-microscopy (e.g., bright-field microscopy or phase-contrast microscopy) of a specimen. The apparatus comprises an NFM microscope including an NFM probe, a first condenser lens system that converges a center portion of an illumination-light flux at a first terminus of the NFM probe, and a second condenser lens system that converges an annular portion of the illumination-light flux at a specimen to illuminate the specimen by Köhler illumination. Evanescent light from a distal terminus of the NFM probe passes to a locus on the specimen. Downstream optics capture light transmitted and/or scattered from the specimen from the NFM probe and from the Köhler illumination to produce both a light-microscope image of the specimen and an NFM image of the specimen.

17 Claims, 2 Drawing Sheets

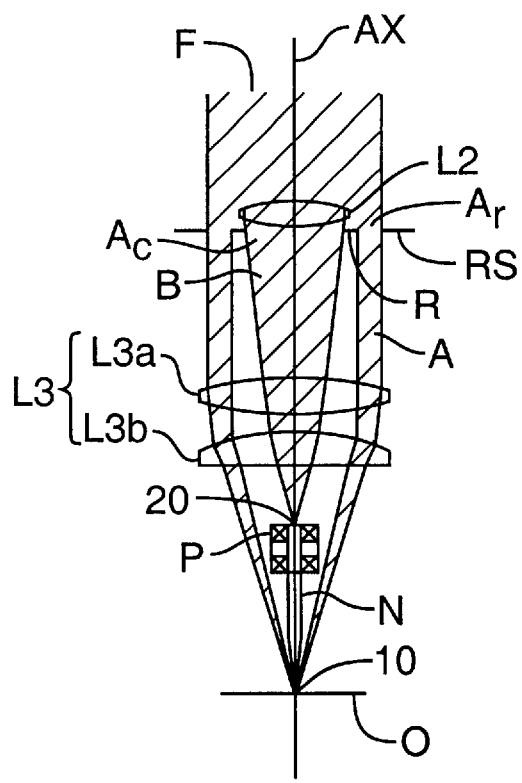
FIG. 2
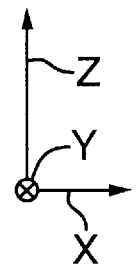
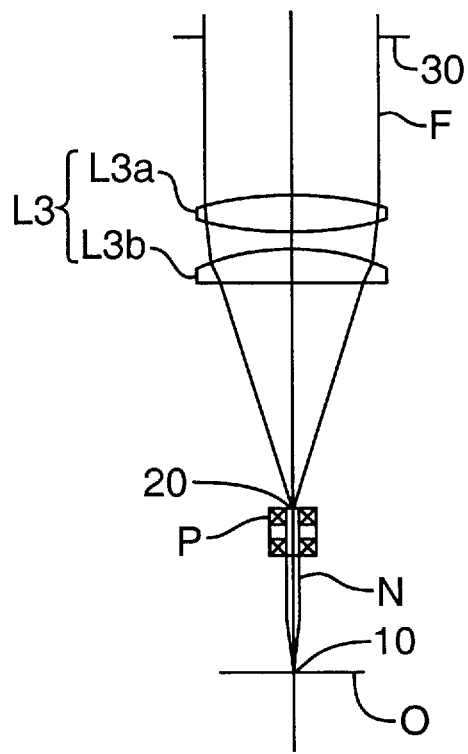
FIG. 3 (Prior Art)
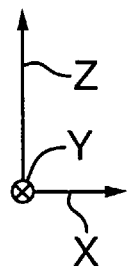

INTEGRATED MICROSCOPE PROVIDING NEAR-FIELD AND LIGHT MICROSCOPY

FIELD OF THE INVENTION

The present invention pertains to near-field microscopes (NFMs) and light microscopes, especially to optical instruments that are operable to perform near-field microscopy in addition to observations of specimens by light microscopy, e.g., bright-field and phase-contrast microscopy on demand.

BACKGROUND OF THE INVENTION

In an near-field microscope (NFM), illumination light is made incident on a first end of a glass rod or optical fiber referred to as an NFM probe. The other end (i.e., the distal end) of the NFM probe is sharply pointed to form a point source of light having dimensions typically much smaller than the wavelength of the illumination light. When the distal end of the probe is maneuvered into close proximity to a specimen (i.e., a distance from the specimen smaller than the wavelength of the illumination light), light waves spanning the gap from the distal end to the adjacent locus on the specimen are evanescent. This evanescent light permits observation of the locus with a degree of resolution substantially greater than otherwise would be possible with most other light microscopy methods using the same wavelength of illumination light. The region of the specimen that can be observed using NFM, however, is very small.

FIG. 3 schematically shows certain features of a conventional NFM system. An illumination-light flux F generated by a high-intensity light source (not shown) is restricted by passage through an aperture diaphragm 30 (the light source is situated above the aperture diaphragm 30 in the figure). The illumination-light flux F then passes through a condenser lens L3 (comprising lens elements L3a, L3b) that converges the light flux to a point at an entrance end 20 of an NFM probe N. (The entrance end 20 is situated at a focal point of the condenser lens L3.) The distal end 10 of the probe N is positioned near the specimen O as mentioned above. A piezo element P or analogous scanner is attached to the NFM probe N. The piezo element P is operable to cause the NFM probe N to scan two-dimensionally (in the X-Y plane) with respect to the specimen O.

The evanescent light propagating from the terminus 10 of the NFM probe N to the specimen O is scattered or transmitted by the specimen and is converged by an objective lens (not shown in the figure) to form an NFM image of the specimen. The NFM image can then be observed and/or otherwise analyzed.

Because an NFM image must be constructed from a series of scans in the X-Y plane, significant time is required to obtain each NFM image. In addition, each NFM image is of a very small region of the specimen. It is frequently necessary to obtain a number of NFM images of the specimen, thereby consuming much time, before finding a desired locus on the specimen for further NFM examination. Thus, there is a need for a way to simultaneously observe a substantially larger region of the specimen than is observable by NFM so as to facilitate more rapid finding of the desired locus on the specimen for further NFM examination.

The NFM probe N normally has a length of only a few centimeters due in part to the need to attach it to the scanner P. Unfortunately, the probe N, the scanner P, and the condenser lens L13 in a conventional NFM, while useful for performing NFM microscopy, are obstructions that would block sufficient illumination for larger-scope observations of the specimen by light-microscopy methods such as bright-field microscopy or phase-contrast microscopy.

Furthermore, because time is required to obtain each NFM image, a conventional NFM cannot be used for instantaneous on-demand observation of a specimen. Thus, there is a need for an integrated apparatus operable to perform both NFM and at least one light-microscopy method capable of producing on demand a larger-scope image of the specimen than NFM.

SUMMARY OF THE INVENTION

An object of the present invention is to provide an NFM integrated microscope that is operable to solve the above-referenced shortcomings of the prior art. A more specific object is to provide an NFM integrated microscope that is operable to perform NFM observations of a specimen as well as larger-scope ("total") observations such as bright-field observations and phase-contrast observations of the specimen on demand.

According to one aspect of the present invention, an integrated microscope is provided. The integrated microscope comprises, on an optical axis, an irradiation optical system and an observation optical system. The irradiation optical system, which is operable to produce an irradiation-light flux for irradiating a specimen, comprises an NFM probe, a first condenser lens system, and a second condenser lens system. The NFM probe extends along the optical axis and has an entrance terminus and a distal terminus. The first condenser lens system is operable to cause a central portion of the irradiation-light flux to converge on the entrance end of the NFM probe so as to form an evanescent wave of light from the distal end of the probe to a locus on the specimen. The second condenser lens system is operable to cause a peripheral portion of the irradiation light flux to converge at a region on the specimen. The observation optical system comprises a first observation lens system operable to collect light from the evanescent wave that is scattered or transmitted by the locus on the specimen, and a second observation lens system operable to collect light scattered or transmitted from the region on the specimen.

The integrated microscope can include a light source operable to produce the irradiation light flux and to propagate the irradiation light flux along the optical axis.

The integrated microscope can also include a stop that defines a central aperture and a coaxial annular aperture. The central and annular apertures are preferably situated so as to produce, from the irradiation light flux propagating from the light source, the central and peripheral portions of the irradiation light flux, respectively.

Preferably, the first condenser lens system comprises first condenser lens and a second condenser lens, and the second condenser lens system comprises the second condenser lens. For example, the second condenser lens system preferably comprises two positive lenses, and the first condenser lens system preferably comprises the second condenser lens system and a third positive lens (the third positive lens preferably spans the central aperture). Thus, the first condenser lens system preferably has a shorter focal length than the second condenser lens system.

In the integrated microscope summarized above, the observation optical system preferably includes, on the optical axis, an objective lens and a beam-splitting prism. The beam-splitting prism is operable to reflect light along a first branch of the optical axis to the first observation lens system and to transmit light along a second branch of the optical axis to the second observation lens system. In such a configuration, the objective lens is operable to form a first primary image of the specimen on the first branch of the optical axis and a second primary image of the specimen on the second branch of the optical axis. The first observation lens system preferably includes a photomultiplier situated on the first branch of the optical axis, and the second observation lens system preferably includes a relay lens and an eyepiece lens to permit observation by user of the second primary image.

According to another aspect of this invention, an apparatus is provided for performing near-field microscopy and light microscopy of a specimen. The apparatus comprises, on an optical axis, a stop, a near-field microscope subsystem, and a light-microscope subsystem. The stop defines a central aperture and a coaxial annular aperture. The stop is operable to produce, from an illumination light flux propagating along the optical axis, a central light flux and an annular light flux coaxial with the central light flux. The near-field microscope subsystem comprises, on the optical axis, a first condenser lens system, an NFM probe, an objective lens, and a photosensor. The first condenser lens system is operable to converge the central light flux onto the entrance of the NFM probe. The NFM probe is operable to produce, from the central light flux, evanescent light that passes from a distal terminus of the NFM probe to a locus on the specimen. The objective lens is operable to produce, from the evanescent light interacting with the locus, an image of the locus analyzable by the photosensor. Finally, the light-microscope subsystem comprises, on the optical axis, a second condenser lens system that is operable to converge the annular light flux onto the specimen. The objective lens also produces a viewable image of a region of the specimen on which the annular light flux is incident.

In the foregoing apparatus, the first condenser lens system preferably has a fixed first focal length and the second condenser lens system has a second focal length that is preferably longer than the first focal length. It is also preferable for the first condenser lens system to include a first condenser lens having a positive refractive power and for the second condenser lens system to include a second condenser lens having a positive refractive power.

The foregoing and additional features and advantages of the present invention will be more readily apparent from the following detailed description, which proceeds with reference to the accompanying drawings.

BRIEF DESCRIPTION OF THE DRAWINGS

FIG. 2 is a more detailed elevational view of the NFM probe and nearby components of the FIG. 1 embodiment.

FIG. 3 is a schematic optical diagram of the NFM probe and nearby components of a representative prior-art NFM.

DETAILED DESCRIPTION

Figure 1:
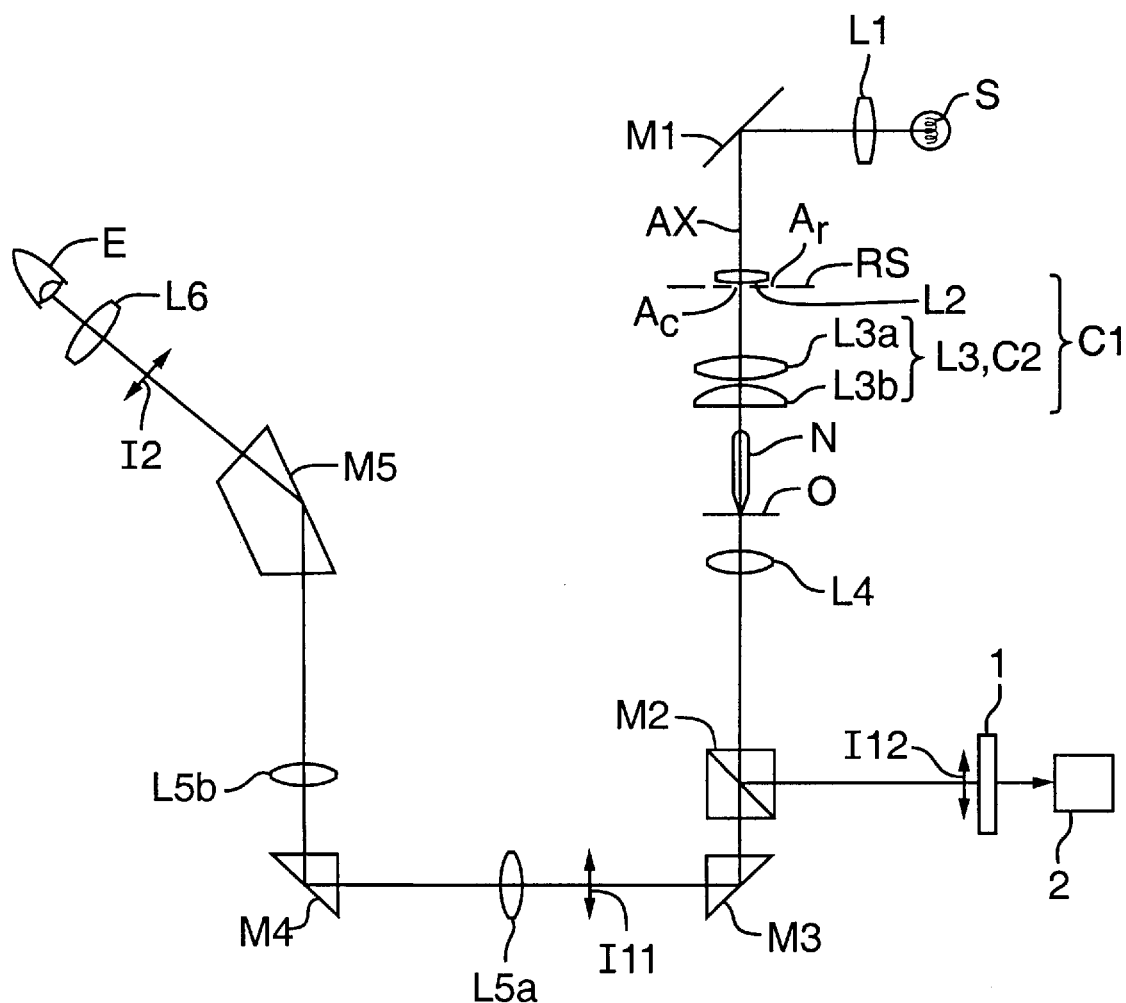
FIG. 1 is a schematic optical diagram showing certain features of an NFM integrated microscope apparatus according to a preferred embodiment of the present invention.

As used herein, "light microscopy" shall refer to microscope methods, other than NFM, involving illumination of a specimen using light.

General features of a preferred embodiment of an NFM integrated microscope according to the present invention are illustrated in FIG. 1, which represents the current best mode. Components shown in FIG. 1 that are the same as shown in FIG. 3 have the same reference designators.

Arranged on an optical axis AX are the following components: a light source S, collector lens L1, a first mirror M1, a first condenser lens L2 having positive refractive power, a stop or diaphragm RS defining a preferably circular central aperture $A_c$ and a separate coaxial annular (ring-shaped) aperture $A_r$, a second condenser lens L3 having positive refractive power and preferably comprising a first positive lens L3a and a second positive lens L3b, an NFM probe N, a specimen O, an objective lens L4, a beam-splitting prism M2, a second mirror M3, a first relay lens L5a, a third mirror M4, a second relay lens L5b, a reflective prism M5, and an eyepiece lens L6. A primary image of the specimen O is formed at each of the locations designated $I_{11}$ and $I_{12}$, and an observation image of the specimen is formed at the location designated $I_2$. Also situated on a branch portion of the optical axis AX split by the beam-splitting prism M2 is a photomultiplier 1 and a monitor 2. An observer's eye would be situated at the location designated E.

A first condenser system C1 comprises a combination of the first condenser lens L2 and the second condenser lens L3. A second condenser system C2 comprises the second condenser lens L3 but not the first condenser lens L2, as will become clearer below. The first condenser lens L2 and the stop RS are preferably integrally constructed, with the first condenser lens L2 being situated so as to span the central aperture $A_c$ and the annular aperture $A_r$ in surrounding relationship to the central aperture $A_c$. In addition, the stop RS and the first condenser lens L2 are preferably freely insertable and removable with respect to the optical axis AX.

The light source S, collector lens L1, and first mirror M1 collectively function to supply an illumination light flux in a conventional manner. Specifically, the light source S is operable to provide an illumination-light flux for both NFM microscopy and for any of various "larger-scope" light-microscopy techniques that can be performed using the apparatus of FIG. 1, such as light-field microscopy, dark-field microscopy, and phase-contrast microscopy. After being converged by the collector lens L1, the illumination-light flux is reflected by the first mirror M1 and propagates, preferably as parallel rays, toward the first condenser lens L2.

The first condenser system C1 is operable to converge light propagating in the central region of the illumination light flux to a point at the entrance end of the NFM probe N. The second condenser system C2 is operable to converge light propagating at the periphery of the illumination light flux on the specimen O. In other words, the illumination light flux is simultaneously converged at two points, one at the entrance end of the NFM probe N and the other at the specimen O. As a result, an NFM observation image of a locus on the specimen can be formed from illumination light irradiated at the specimen from the sharp end of the NFM probe N, and a light-microscope image of a larger region of the specimen can be simultaneously formed from illumination light that bypasses the NFM probe N before irradiating the specimen.

The foregoing is more clearly illustrated in FIG. 2, wherein the illumination light flux F propagates as substantially parallel rays (relative to the optical axis AX) toward the stop RS. As can be seen, the stop RS defines a central aperture $A_c$ and an annular aperture $A_r$. These apertures are separated from each other by an annular ring R. The first condenser lens L2 can be supported by the annular ring R so as to span the entire central aperture $A_c$.

The illumination light flux F, upon encountering the stop RS, is divided into two coaxial light fluxes; an annular flux A resulting from passage of light through the annular aperture $A_r$, and a central flux B resulting from passage of light through the central aperture $A_c$. The central flux B is also refracted by the first condenser lens L2 while the annular flux A is not. Rather, the annular flux A propagates as substantially parallel rays until encountering the second condenser lens L3 (preferably including separate first and second positive lenses L3a, L3b, respectively). The second condenser lens L3 converges the annular flux A; thus, the annular flux A illuminates, by Köhler illumination, the specimen O positioned at the rear focal point of the second condenser lens L3. This Köhler illumination is used to illuminate the specimen for light microscopy of relatively large regions of the specimen.

Meanwhile, the central flux B, after being refracted by the first condenser lens L2 and passing through the central aperture $A_c$, is further converged by the second condenser lens L3 to a point located at the entrance terminus 20 of the NFM probe N.

The distal terminus 10 of the NFM probe N is sharply pointed. The position of the distal terminus 10 is adjacent (and very near as customary in NFM microscopy) the specimen O.

Thus, the first condenser lens L2 and the second condenser lens L3 together comprise a first condenser system C1 operable to cause the central flux B of illumination light from the light source S to converge at a point on the entrance terminus 20 of the NFM probe N. After passing though the NFM probe, this light flux B passes as an evanescent light wave from the distal terminus 10 of the NFM probe N to the specimen O, thereby becoming illumination light for NFM observation of the particular locus on the specimen O immediately adjacent the distal terminus 10.

A piezo element P or analogous scanning means is attached to the NFM probe N. The piezo element P is operable to displace the NFM probe N in two dimensions (i.e., in the X and Y plane) so as to scan the specimen O over a defined range.

Referring further to FIG. 1, light from the annular light flux A illuminating the specimen O via Köhler illumination and transmitted through the specimen, as well as light (from the central light flux B) passing as evanescent light from the distal terminus 10 of the NFM probe N and transmitted through and/or scattered by the specimen, both propagate to the beam-splitting prism M2 via the objective lens L4. The light originating as evanescent light from the distal terminus 10 of the NFM probe N, after passing through the specimen O, has an intensity profile dependent on the shape and material properties of the specimen.

Light transmitted through the beam-splitting prism M2 is reflected by the second mirror M3 and forms the primary image $I_{11}$ of the specimen O usable for light-microscopy observation of the specimen. To such end, the light from the primary image $I_{11}$ passes through the first relay lens L5a, is reflected by the third mirror M4, passes through the second relay lens L5b, is reflected by the reflective prism M5, and forms the observation image $I_2$. The observation image $I_2$ is viewed by an observer using the eyepiece lens L6. Thus, the observer can perform any of various light-microscopy methods, e.g., bright-field microscopy or phase-contrast microscopy, of the specimen.

Light reflected by the beam-splitting prism M2 forms the second primary image $I_{12}$ of the specimen O that can be used for light-microscopy observation of the specimen as well as NFM observation of the specimen. The second primary image $I_{12}$ can be analyzed by any of various devices such as the photomultiplier 1 or analogous image-analyzing means.

For NFM observation of a locus on the specimen, the annular aperture $A_r$ is preferably blocked to prevent formation of the annular flux A. Then, while the locus on the specimen is being scanned by the evanescent light from the distal terminus 10 of the NFM probe N, the resulting primary image $I_{12}$ is analyzed by the photomultiplier 1. Thus, an NFM-produced distribution of light intensity is produced at the location of the primary image $I_{12}$. The distribution of light is based on physical attributes of the locus of the specimen in regions adjacent the distal terminus of the probe N. The information generated by the photomultiplier 1 can be visualized using the monitor 2.

Thus, it is now possible, using the same instrument, to simultaneously perform NFM-microscope observations of small loci on a specimen and ordinary light-microscope observations (e.g., bright-field microscopy or phase-contrast microscopy) of relatively larger regions on the specimen on demand without having to move the specimens or any of the condenser lenses or other components of the apparatus. Also, it is now possible, using the same instrument, to employ light microscopy to find a desired locus on a specimen for examination by NFM, and then to perform NFM at that locus without having to move the specimen or any of the components of the apparatus. In addition, the obtaining of light-microscope images of the specimen as well as NFM images of selected loci on the specimen can now be performed quickly and simply.

Furthermore, because the first condenser lens L2 and the stop RS are preferably freely insertable and removable with respect to the trajectory of the illumination light flux, phase-contrast observations of the specimen are possible at different magnifications by exchanging the current stop RS with another having a differently sized annular aperture $A_r$.

In the FIG. 1 embodiment, light from the specimen O is divided by the beam-splitting prism M2. Alternatively, for example, the primary image $I_{11}$ or the primary image $I_{12}$ can be formed by replacing the beam-splitting prism M2 with an analogous light-switching means such as a freely insertable and removable mirror.

Further with respect to the FIG. 1 embodiment, the primary image $I_{12}$ is preferably detected and analyzed by the photomultiplier 1. Alternatively, for example, to perform NFM observations, the intensity of light transmitted through the specimen O from the evanescent light from the distal terminus 10 of the NFM probe N can be detected. This allows the intensity of the transmitted light from the specimen O to be detected at an optimum position within the light path without restricting the position where the primary image of the specimen O is formed.

Furthermore, with respect to the FIG. 1 embodiment, each of the first and second condenser systems C1, C2 comprises one or more refractive lenses having positive refractive power. Alternatively, it is possible to produce images at two points by means of such systems that comprise one or more reflective elements.

Therefore, an NFM integrated microscope is provided that permits, on demand, both NFM observations and light-microscopy (e.g., bright-field microscopy and/or phase-contrast microscopy) observations of a specimen to be performed. These observations can be performed without moving lenses or other components of the apparatus. In addition, it is now possible to quickly obtain a light-microscopy image of the specimen as well as an NFM image of one or more desired loci on the specimen.

Whereas the invention has been described in connection with a preferred embodiment, it will be understood that the invention is not limited to that embodiment. On the contrary, the invention is intended to encompass all alternatives, modifications, and equivalents as may be included within the spirit and scope of the invention as defined by the appended claims.

What is claimed is:

1. An integrated microscope, comprising on an optical axis:
  (a) an irradiation optical system operable to produce an irradiation-light flux for irradiating a specimen, the irradiation optical system comprising an NFM probe extending along the optical axis and having an entrance terminus and a distal terminus; a first condenser lens system operable to cause a central portion of the irradiation-light flux to converge on the entrance terminus of the NFM probe so as to form an evanescent wave of light from the distal terminus of the probe to a locus on the specimen; and a second condenser lens system operable to cause a peripheral portion of the irradiation light flux to converge at a region on the specimen;
  (b) an observation optical system comprising a first observation lens system operable to collect light from the evanescent wave that is scattered or transmitted by the locus on the specimen, and a second observation lens system operable to collect light scattered or transmitted from the region on the specimen; and
  (c) a stop defining a central aperture and a coaxial annular aperture, the central and annular apertures being situated so as to produce, from the irradiation light flux, the central and peripheral portions, respectively, of the irradiation light flux.

2. The integrated microscope of claim 1, wherein the NFM probe comprises a scanner.

3. The integrated microscope of claim 2, wherein the scanner comprises a piezo element.

4. The integrated microscope of claim 1, further comprising a light source operable to produce the irradiation light flux and to propagate the irradiation light flux along the optical axis.

5. The integrated microscope of claim 1, wherein the first condenser lens system comprises a first condenser lens and a second condenser lens, and the second condenser lens system comprises the second condenser lens.

6. The integrated microscope of claim 5, wherein the first condenser lens system has a shorter focal length than the second condenser lens system.

7. The integrated microscope of claim 6, wherein the second condenser lens system comprises two positive lenses and the first condenser lens system comprises the second condenser lens system and a third positive lens.

8. The integrated microscope of claim 6, further comprising a stop defining a central aperture and a coaxial annular aperture, the central and annular apertures being situated so as to produce, from the irradiation light flux propagating from the light source, the central and the peripheral portions of the irradiation light flux, respectively.

9. The integrated microscope of claim 8, wherein the third condenser lens spans the central aperture.

10. The integrated microscope of claim 1, wherein the observation optical system comprises, on the optical axis, an objective lens and a beam-splitting prism, the beam-splitting prism being operable to reflect light along a first branch of the optical axis to the first observation lens system and to transmit light along a second branch of the optical axis to the second observation lens system.

11. The integrated microscope of claim 10, wherein the objective lens is operable to form a first primary image of the specimen on the first branch of the optical axis and a second primary image of the specimen on the second branch of the optical axis.

12. The integrated microscope of claim 10, wherein the first observation lens system comprises a photomultiplier situated on the first branch of the optical axis, the photomultiplier being operable to analyze the first primary image.

13. The integrated microscope of claim 10, wherein the second observation lens system comprises a relay lens and an eyepiece lens to permit observation by user of the second primary image.

14. An apparatus for performing near-field microscopy and light microscopy of a specimen, the apparatus comprising on an optical axis:
  (a) a stop defining a central aperture and a coaxial annular aperture, the stop being operable to produce, from an illumination light flux propagating along the optical axis, a central light flux and an annular light flux coaxial with the central light flux;
  (b) a near-field microscope subsystem comprising on the optical axis a first condenser lens system, an NFM probe, an objective lens, and a photosensor, the first condenser lens system being operable to converge the central light flux onto the entrance of the NFM probe, the NFM probe being operable to produce, from the central light flux, evanescent light that passes from a distal terminus of the NFM probe to a locus on the specimen, and the objective lens being operable to produce, from the evanescent light interacting with the locus, an image of the locus analyzable by the photosensor; and
  (c) a light-microscope subsystem comprising, as situated on the optical axis, a second condenser lens system operable to converge the annular light flux onto the specimen, the objective lens being further operable to produce a viewable image of a region of the specimen on which the annular light flux is incident.

15. An integrated microscope, comprising on an optical axis:
  (a) an irradiation optical system comprising a stop defining a central aperture and a coaxial annular aperture, the central aperture being operable to produce, from an illumination-light flux, a central light flux, and the annular aperture being operable to pass, from the illumination-light flux, an annular light flux surrounding the central light flux;
  (b) an NFM probe having an entrance end and a distal end, the NFM probe being operable to produce, whenever the distal end is situated closely adjacent a locus on a specimen and a light flux is incident on the entrance end, an evanescent light wave extending from the distal end to the locus;
  (c) a first condenser lens system operable to converge the central light flux onto the entrance end of the NFM probe so as to cause the probe to produce an evanescent light wave from the distal end to the locus;
  (d) a second condenser lens system operable to converge the annular light flux onto the specimen so as to illuminate a region of the specimen by Köhler illumination; and
  (e) an objective lens system operable to form a first image of the locus on the specimen illuminated by the evanescent wave, and to form a second image of the region of the specimen illuminated by the Köhler illumination.

16. The integrated microscope of claim 15, wherein the first condenser lens system comprises a first condenser lens spanning the central aperture and a second condenser lens situated between the stop and the entrance end of the NFM probe.

17. The integrated microscope of claim 16, wherein the second condenser lens comprises a first positive lens and a second positive lens.

* * * * *